United States Patent [19]

Sanderson et al.

[11] Patent Number: 5,085,949

[45] Date of Patent: Feb. 4, 1992

[54] FUEL CELL GENERATION SYSTEM

[75] Inventors: Robert A. Sanderson, Wethersfield, Conn.; Katsunori Sakai, Yokohama, Japan; Takeshi Kuwabara, Hachioji, Japan; Takashi Amemiya, Kawasaki, Japan

[73] Assignee: Kabushiki Kaisha Toshiba, Kawasaki, Japan

[21] Appl. No.: 650,761

[22] Filed: Feb. 5, 1991

[51] Int. Cl.⁵ .............................................. H01M 8/04
[52] U.S. Cl. ........................................ 429/23; 429/24; 429/26
[58] Field of Search ........................ 429/22, 23, 24, 26

[56] References Cited

U.S. PATENT DOCUMENTS

| | | | |
|---|---|---|---|
| 3,539,397 | 11/1970 | Keating, Jr. et al. | 429/23 |
| 3,773,559 | 11/1973 | Warszawski et al. | 429/23 X |
| 3,801,372 | 4/1974 | Shaw | 429/23 X |
| 3,849,201 | 11/1974 | Kordesch | 429/23 X |
| 4,824,740 | 4/1989 | Abrams et al. | 429/24 |

*Primary Examiner*—Anthony Skapars
*Attorney, Agent, or Firm*—Foley & Lardner

[57] ABSTRACT

A fuel cell generation system comprises a cell stack consisting of a plurality of cells, said cell having a fuel electrode, an oxidizer electrode, and an electrolyte layer located between said both electrodes, a fuel cell main body having a plurality of cooling plates for absorbing heat generated in said cell, said plate being located between said cells, and a cooling unit for supplying a coolant through said cooling plate. The system further provides a reference voltage source for supplying a reference voltage and a determining unit for comparing an output voltage of at least one cell located at the upper portion of the cell main body with the reference voltage and determining if an abnormal state occurs in the cooling unit based on the comparing result. The reference voltage is picked up out of a part of the cell stack.

4 Claims, 3 Drawing Sheets

FUEL CELL GENERATION SYSTEM

BACKGROUND OF THE INVENTION

1. Field of the Invention

The present invention relates to a fuel cell generation system and more particularly to an alarming and protecting system for the cooling water supply provided to the fuel cell.

2. Description of the Prior Art

Recently, attention has been paid on a fuel cell generation system for directly converting fuel energy into electric energy. This fuel cell generation system normally comprises a fuel cell consisting of a pair of porous electrodes and an electrolyte material located between these electrodes, a fuel such as hydrogen coming into contact with the outer side of one electrode and an oxidizer such as oxygen coming into contact with the outside of the other electrode so that the system serves to generate electric energy between the electrodes, which energy results from the electro-chemical reaction caused by the contact of these gases. It can generate electric energy at high conversion efficiency as long as the fuel and oxidizer are supplied through the system.

FIG. 3 is a vertical section showing arrangement of a normal fuel cell and FIG. 4 is a plan view showing the same arrangement. As shown, the normal fuel cell comprises a cell stack 1 having a plurality of cells, the single cell consisting of an electrolyte layer formed by impregnating a matrix with phosphoric acid served as electrolyte and a pair of porous electrodes on the both sides of the electrolyte layer. The cell stack 1 includes manifolds 2, 3 used for supply and discharge of a reaction gas.

The manifolds 2 are connected to a fuel supply pipe 4 and a fuel discharge pipe 5 so that these pipes 4, 5 are located on both opposite sides of the cell stack 1. It is also connected to an air supply pipe 6 and an air discharge pipe 7 so that these pipes 6, 7 are perpendicular to the pipes 4, 5 and are located on both opposite sides of the cell stack 1.

And, the cell stack 1 provides the top pressure plate 9 and the lower pressure plate 10 on the upper and the lower surfaces through insulating plates 8 located therebetween. These pressure plates have fastening members consisting of rods 11 and nuts 12 fastened at each end of the upper and the lower surfaces of the cell stack. The fastening members serve to firmly fasten a plurality of cells together.

And, the fuel cell main body described above is fixed on a support 15 with bolts. The support 15 is located above a lower tank 14. Parts of tanks, 16 and 17 cover the whole of the fuel cell assembly. Further, a plurality of cooling plates 18 are inserted into the cell stack 1 for removing heat generated within the fuel cell.

The fuel cell stack 1 is cooled to a proper operating temperature by cooling water which flows through passages formed in the cooling plates. The cooling water containing excessive heat is discharged out from outlet header 20.

It is well known that such a cooling system for a fuel cell has two types, that is, a pressurized water cooling system and a boiling water cooling system.

The pressurized water cooling system requires far more cooling water than the boiling water cooling system, resulting in disadvantageously greater auxiliary power and thereby lowering efficiency of the fuel cell generation system. Hence, the fuel cell normally employs the boiling water cooling system. This system uses latent heat of vaporization contained in the cooling water, thereby reducing the amount of the cooling water and the auxiliary power.

The boiling water cooling system is designed to give heat to the cooling water supplied from an inlet header 19. As the water flows through the cooling plates 18 it starts and keeps boiling and is discharged as a two-phase flow consisting of a liquid phase and a vapor phase.

And, the two-phase flow flows through cooling plate outlet pipes 23 and are all gathered at the outlet header 20. Then, the gathered two-phase flow is discharged through the penetration part 21. Finally, it comes into a steam separator 22 through a water outlet pipe 24 of a cell stack 1.

In this case, the fuel cell main body employing the boiling water cooling system has each pressure of the cooling water applied on each cooling plate, that is, cannot offer uniform boiling, because the cooling plates stacked vertically in the cell stack 1 have respective heights so that the cooling water has respective water heads at respective cooling plates as it flows through the cooling plates. Hence, the quality of the two-phase flow is different at the cooling plate outlets extending from the upper to the lower parts of the cell stack. In general, therefore, the amount of cooling water flowing through the upper part of the stack is smaller than that flow through the lower part of the stack. This tendency distinctly occurs in a case where the amount of the cooling water flowing in the fuel cell is reduced by some reason or the load applied on the fuel cell is made excessive. At worst, in the cooling plate located at the upper portion of the cell stack, the cooling water is substantially boiled away, disadvantageously resulting in extremely lowering cooling efficiency of the cooling plates and allowing cell temperature to reach its established upper limit value or more.

However, no acceptable means has been proposed for properly detecting in abnormal state of a cooling water supply system extended over the vertical length of the cell stack. At the present state, hence, the fuel cell may be kept operating though it comes into an abnormal state, resulting in breaking down the fuel cell itself.

For monitoring the abnormal state, for example, by inserting a temperature sensor like a thermocouple into the upper cell, it is possible to detect an abnormal temperature of the cell. The fuel cell used in a normal generation system, however, has so high a voltage applied on the cells that the temperature sensor cannot be sufficiently insulated. It is thus difficult to precisely measure the cell temperature. In addition, the corrosive environment within a fuel cell stack makes temperature measurement very unreliable.

SUMMARY OF THE INVENTION

To overcome the foregoing disadvantages, it is therefore an object of the present invention to provide an alarming and protecting system for a cell cooling water supply which is capable of positively detecting an abnormal state of cooling in the upper stacked cell which results in temperature reaching a predetermined temperature or more in a case where the distribution of the cooling water is magnified in the vertical direction of the cell stack as a result of the two-phase flow cooling and the amount of the cooling water supplied from the inlet header to the upper cooling plate is made lower than a predetermined limit value.

To achieve the foregoing object, the present invention is designed as follows: In a fuel cell generation system comprising a fuel cell main body and a cooling supply, the fuel cell main body including a plurality of fuel cells each having a fuel electrode, an oxidizer electrode and an electrolyte layer located between these electrodes and being connected in series with a load, and a plurality of cooling plates each having a buried cooling pipe and located between the cells for absorbing the heat generated in the fuel cell and the cooling line for cooling the fuel cell main body and the cooling plates, said fuel cell generation system comprises an alarming and protecting system for determining, if the cooling water supply in the cooling line is abnormal, by comparing an output voltage of a particular single or group of cells located at the upper portion of the fuel cell main body with a reference voltage value.

In operation, the fuel cell generation system according to this invention is designed to constantly measure both of output voltage values between the uppermost cooling plates and mean voltage between cooling plates. If, therefore, the cooling water is largely distributed in the vertical direction of the cell stack as a result of two-phase flow cooling and the amount of the cooling water supplied from the inlet header to the upper cooling plate is made lower than the predetermined limit value, the system is capable of detecting a voltage rise caused with the temperature rise of the upper stacked cell by comparing both of the foregoing measured voltage values with each other.

DESCRIPTION OF PREFERRED EMBODIMENTS

Herein, an embodiment of the invention will be detailed with reference to FIG. 1.

Figure 1:
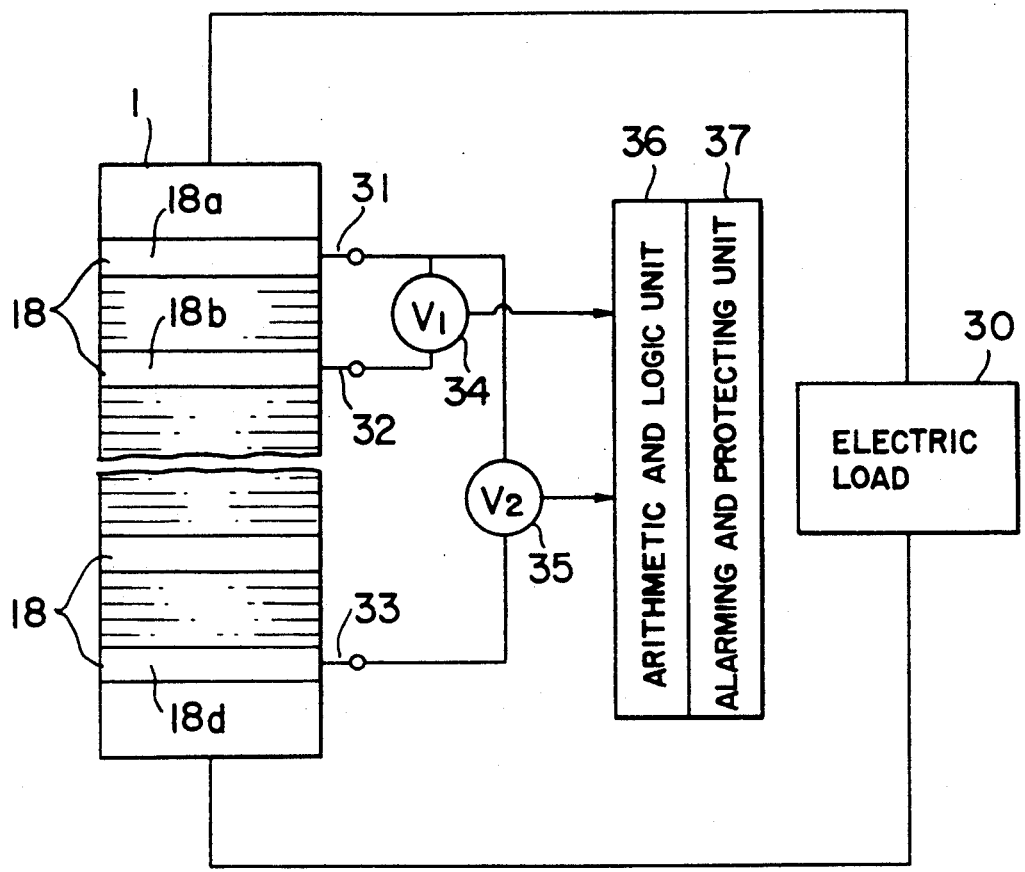
FIG. 1 is a circuit diagram showing an abnormal detecting device according to an embodiment of the present invention.
Figure 3:
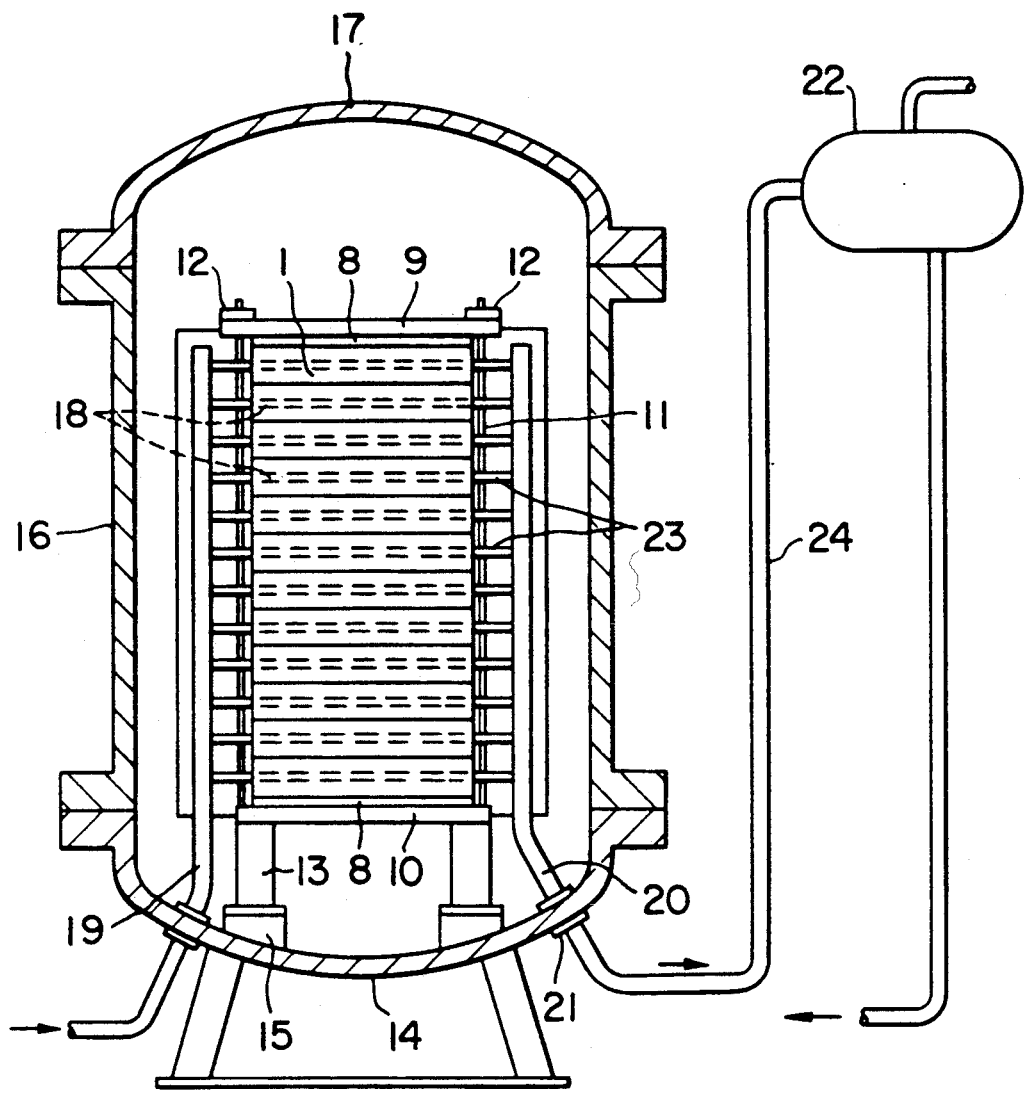
FIGS. 3 and 4 are section and top views showing a conventional fuel cell.
Figure 4:
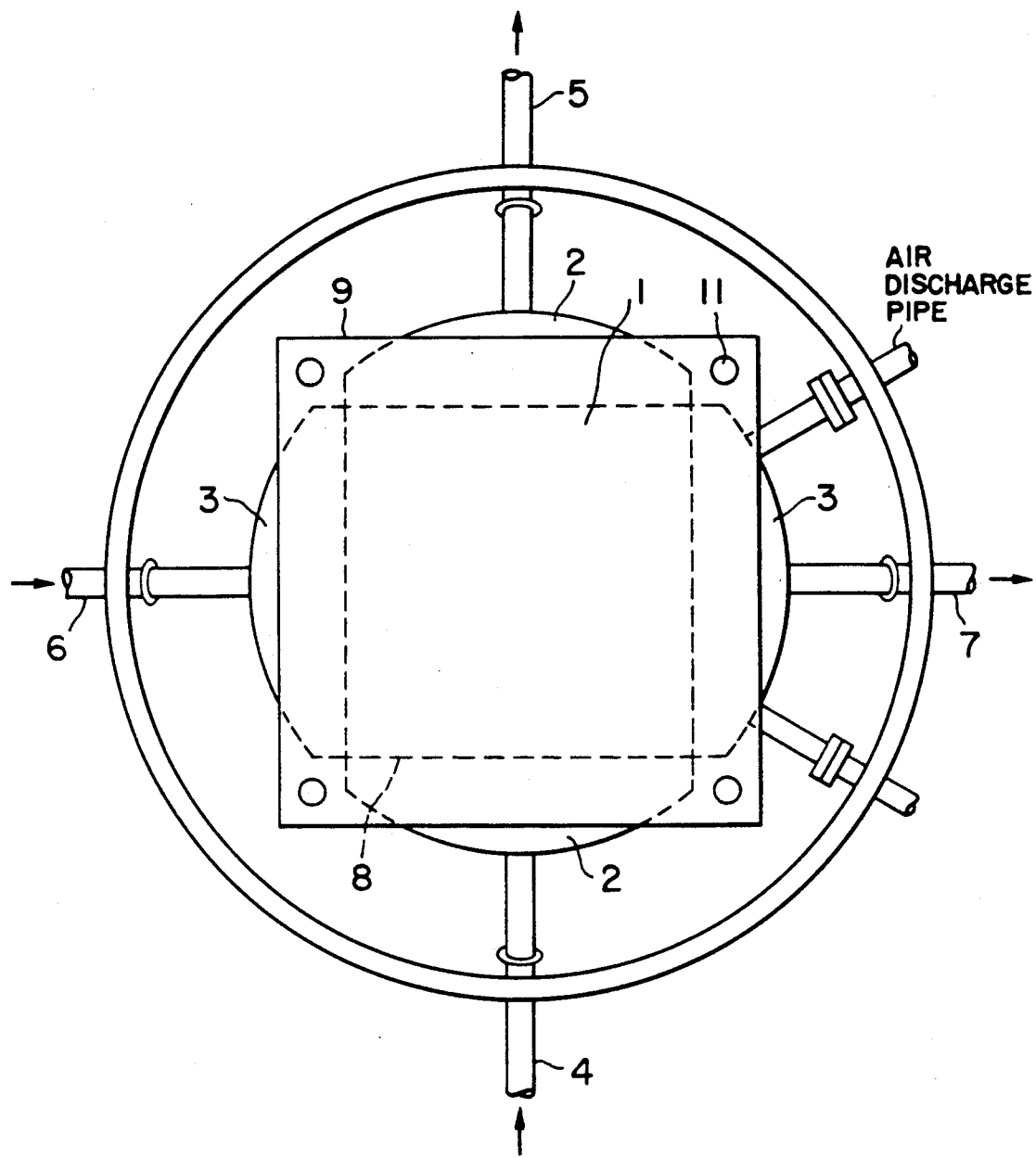

In FIG. 1, the similar elements to those of the conventional device shown in FIGS. 3 and 4 are referenced by the similar numbers and are not described. According to the present embodiment as shown in FIG. 1, an uppermost cooling plate 18-a, a second upper cooling plate 18-b, and the lowest cooling plate 18-d respectively provide voltage detection terminals 31, 32, 33. Further, the embodiment includes an uppermost block voltage detector 34 for measuring an uppermost block voltage between the voltage detection terminals 31 and 32 and a totalblock voltage detector 35 for measuring an total block voltage between the voltage detection terminals 31 and 33. Then, the uppermost block voltage detector 34 and the total block voltage detector 35 supply their outputs to an arithmetic and logic unit 36 in which these outputs are processed. If it is judged that an abnormal state occurs on a two-phase flow cooling system based on the output of the arithmetic and logic unit 36, the arithmetic and logic unit 36 supplies a signal to an alarming and protecting unit 37 for operating it.

In the fuel cell generation system designed as above, the voltage detectors 34, 35 respectively serve to detect voltages applied on the uppermost block and all the blocks and then supply the detected voltages to an arithmetic and logic unit 36 in which the operation is carried out as follows;

voltage rise $\Delta V =$ (uppermost block voltage $V_1$) $-$ (mean block voltage $V_{AV}$)

$$\text{mean block voltage } V_{AV} = \text{(total block voltage } V_2\text{)} / \text{numbers of block} \quad (1)$$

Figure 2:
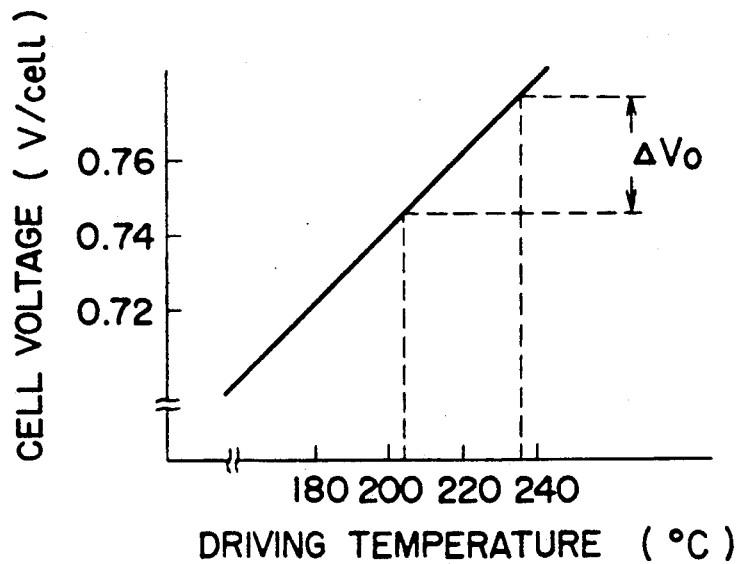
FIG. 2 is a chart of a cell characteristic showing the relation between an operating temperature and a cell voltage.

On the other hand, FIG. 2 illustrate an example of a characteristic between a temperature and a single cell voltage. Assuming that the axis of abscissa denotes a cell temperature and the axis of ordinance denotes a cell voltage, it is clearly understood from the graph shown in FIG. 2 that the characteristic is linear until the temperature reaches about 230° C.

In a case where a cooling water distribution is magnified in the vertical direction of the cell stack as a result of the two-phase cooling and the amount of the cooling water supplied from an upper inlet header is made smaller than a predetermined limit value, the voltage rise $\Delta V$ of the upper stacked cell as being accompanied with the rise of the upper stacked cell temperature can be obtained by substituting the uppermost block voltage $V_1$ and the all-block voltage $V_2$ for the equation (1). If the resulting value $\Delta V$ is over an allowed value or more, it is determined that an abnormal state occurs in the two-phase flow cooling system. The arithmetic and logic unit 36 supplies a signal to the alarming and protecting unit 37 for operating it.

Assuming that a mean operating temperature is 205° C. and an upper limit value of the cell temperature is 235° C., a voltage rise $\Delta V_O$ given from the cell temperature 205° C. to 235° C. can be obtained from the graph shown in FIG. 2. If the relation of $\Delta V > \Delta V_O$ is made larger than the predetermined limit value, it can be determined as "abnormal cell temperature state".

In a case where the cooling water distribution is magnified in the vertical direction of the cell stack as a result of two-phase flow cooling deterioration and the amount of cooling water supplied from the inlet header to the upper cooling plate is made lower than the predetermined limit value, the fuel cell generation system designed as above is capable of rapidly and positively detecting an abnormal state where the upper stacked cell temperature rises to a predetermined temperature or more.

(The Other Embodiment)

The present invention may employ the other arrangement rather than the foregoing embodiment. That is, in a case where the cooling water distribution is magnified in the vertical direction as a result of the two-phase flow cooling deterioration and the amount of cooling water supplied from the inlet header of the upper cooling plate is made lower than the predetermined limit value, the present embodiment is capable of detecting an abnormal state where the upper stacked cell temperature rises to a predetermined temperature or more by comparing the voltage value of the upper stacked cell of the cell main body with a reference voltage value such as a mean cell voltage value of the cell main body. It is possible properly to set how to detect the voltage of the upper stacked cell and the reference voltage.

In a fuel cell designed to include several tens blocks, for example, even if a mean block voltage value of the upper several blocks can be used as the upper stacked cell voltage value, it may satisfy the gist of the invention.

Further, for achieving the same effect, the reference voltage may employ a mean block voltage calculated between the upper and the lower end blocks or a mean block voltage calculated among some divided cell stacks.

[Effect of the Invention]

As described above, the present invention provides a fuel cell generation system which is designed to compare a reference voltage value with a voltage value of a particular single cell or group of cells located at the upper part of the cell stack. Hence, in a case where the cooling water distribution is magnified in the vertical direction of the cell stack as a result of the two-phase flow cooling deterioration and the amount of the cooling water supplied from the inlet header to the upper cooling plate is made lower than a predetermined limit value, the system is capable of rapidly and positively detecting an abnormal state where the upper stacked cell temperature rises to a predetermined temperature or more. It results in preventing the breakdown of the cell caused when the system is kept operating in the abnormal state and offering a great effect in light of safety of the fuel cell and plant operation.

What is claimed is:

1. In a fuel cell generation system comprising a cell stack consisting of a plurality of cells, said cell having a fuel electrode, an oxidizer electrode, and an electrolyte layer located between said both electrodes, a fuel cell main body having a plurality of cooling plates for absorbing heat generated in said cell, said plate being located between said cells, and having a line for supplying a coolant through said cooling plate, said fuel cell generation system comprising;
   a reference voltage source for supplying a reference voltage, and
   a determining means for comparing an output voltage of at least one cell located at an upper portion of said cell main body with said reference voltage and determining if an abnormal state occurs on said cooling line.

2. The fuel cell generation system as claimed in claim 1, wherein said determining means serves to compare an output voltage of at least one cell with said reference value and estimate a cell characteristic of said cell and variation of a cell characteristic of cells composing said cell stack.

3. The fuel cell generation system as claimed in claim 1, wherein said reference voltage employs an output voltage of said cell stack and a mean output voltage of the cells contained in said cell stack.

4. The fuel cell generation system as claimed in claim 1, wherein said at least one cell employs an upper cell located between the cooling plate adjacent to the uppermost cell contained in said cell stack and the second highest cooling plate as well as a lower cell located between the cooling plate adjacent to the lowest cell contained in said cell stack and the second lowest cooling plate.

* * * * *